United States Patent [19]
Fröhlingsdorf

[11] Patent Number: 5,762,461
[45] Date of Patent: Jun. 9, 1998

[54] APPARATUS FOR AUTOMATICALLY POSITIONING A RECEPTACLE PICKUP ARM

[75] Inventor: Udo Fröhlingsdorf, Olpe/Biggesee, Germany

[73] Assignee: Gebr. Otto KG, Kreuztal, Germany

[21] Appl. No.: 620,284

[22] Filed: Mar. 22, 1996

[30] Foreign Application Priority Data

Mar. 22, 1995 [DE] Germany ............ 195 10 359.9

[51] Int. Cl.$^6$ .................................................. B65F 3/04
[52] U.S. Cl. .................................. 414/408; 901/35
[58] Field of Search ....................... 414/406, 408, 414/409; 901/35, 33, 47

[56] References Cited

U.S. PATENT DOCUMENTS

| | | | |
|---|---|---|---|
| 3,765,554 | 10/1973 | Morrison | 414/408 |
| 3,841,508 | 10/1974 | Ebeling et al. | 414/406 |
| 4,541,771 | 9/1985 | Beni et al. | 901/35 X |
| 4,645,018 | 2/1987 | Garbade et al. | 414/406 X |
| 4,722,658 | 2/1988 | Wurtz et al. | 414/406 X |
| 4,950,987 | 8/1990 | Vranish et al. | 901/35 X |
| 5,004,392 | 4/1991 | Naab | 414/406 X |
| 5,059,079 | 10/1991 | Foulke et al. | 901/35 X |
| 5,071,307 | 12/1991 | Carson | 414/408 |
| 5,116,094 | 5/1992 | Jones | 901/35 X |
| 5,165,835 | 11/1992 | Schafer | 414/406 |
| 5,215,423 | 6/1993 | Schulte-Hinsken et al. | 414/408 |
| 5,505,576 | 4/1996 | Sizemor et al. | 414/408 X |
| 5,539,292 | 7/1996 | Vranish | 901/35 X |

FOREIGN PATENT DOCUMENTS

| | | | |
|---|---|---|---|
| 0 078 011 | 10/1982 | European Pat. Off. | |
| 0 214 453 | 7/1986 | European Pat. Off. | |
| 3332059 | 3/1985 | Germany | 414/408 |
| 39 09 762 | 9/1990 | Germany | |
| 3933795 | 4/1991 | Germany | 414/406 |
| 41 00 222 | 7/1992 | Germany | |
| 92 11 468 | 1/1993 | Germany | |
| 93 10 115 | 12/1993 | Germany | |
| 9114639 | 10/1991 | WIPO | 414/406 |

OTHER PUBLICATIONS

IBM Technical Disclosure Bulletin, "Computer Controlled Robot with Ultrasonic Sensor", Affinito et al, vol. 18, No. 8, Jan., 1976.

Hydraulics & Pneumatics, "10–Solenoid–Value Control Stick Gives Truck Operator 'Extrahands'", Copeland, vol. 29, No. 9, Sep., 1976.

*Primary Examiner*—David A. Bucci
*Attorney, Agent, or Firm*—Herbert Dubno; Yuri Kateshov

[57] ABSTRACT

An apparatus for picking up a trash receptacle has at least two metallic and spaced apart guide elements on the receptacle, a pickup arm having a head, and at least two respective sensors on the head alignable with the guide elements for electrically detecting the guide elements and for generating an electrical output indicating their proximity. A computer is connected to the arm and to the sensors for positioning the head relative to the receptacle in accordance with the outputs of the sensors.

18 Claims, 2 Drawing Sheets

APPARATUS FOR AUTOMATICALLY POSITIONING A RECEPTACLE PICKUP ARM

FIELD OF THE INVENTION

The present invention relates to an apparatus for positioning a receptacle pickup arm. More particularly this invention concerns such an apparatus which automatically positions a pickup arm so it can lift a trash receptacle or the like.

BACKGROUND OF THE INVENTION

In a standard trash-collecting system the trash is held at the businesses and residences from which it is to be collected in standardized containers, for instance meeting DIN AFNOR. The collection truck is provided with a pickup arm having a head adapted to fit a formation on the container so the container can be lifted and emptied into the truck.

German patent document 3,909,762 describes a system wherein the position of the object, in particular the trash receptacle, is determined by means of a video-optical sensor. In this system a sensor illuminates and reads reflective markings provided on the receptacle. Once the appropriate markings are detected, the pickup arm is maneuvered into place, moving largely automatically.

The disadvantage of such an arrangement is that the markings can easily become unreadable, in particular when used on a trash-collecting container. The rough use such a container is put to quickly reduces or eliminates any reflectivity of the markings. In addition it is necessary to cast a beam of light on the markings so as to be able to read them, requiring that the system operator operate the lamp and, if necessary, clean the markings so they can be read.

In another system described in German 4,100,222 with contact-free identification of objects, in particular trash receptacles, identification elements which are formed by two different materials at a specific geometric relationship to each other are used for identification purposes. A location on the receptacle carries these identification elements which are of metal and plastic and positioned to form a readable code. The reader has sensors which are set to a predetermined reading depth in order to recognize the variable distance between the reader and the identification elements. It is also possible to focus the sensors on the identification elements by variation of the reading depth.

In this system the reader must be positioned exactly parallel to the identification elements in order to be able to read them properly. Thus the device must be manually set. It is also necessary to have a test code which is used to verify the read information. When the receptacle contains metallic trash, false readings are common unless the system is equipped with complex and expensive electronic systems to control the focussing depth.

OBJECTS OF THE INVENTION

It is therefore an object of the present invention to provide an improved apparatus for automatically positioning a pickup arm.

Another object is the provision of such an improved apparatus for automatically positioning a pickup arm which overcomes the above-given disadvantages, that is which allows the arm to engage and pick up a container, normally filled with trash, while being of simple and rugged construction.

SUMMARY OF THE INVENTION

An apparatus for picking up a trash receptacle has according to the invention at least two metallic and spaced apart guide elements on the receptacle, a pickup arm having a head, and at least two respective sensors on the head alignable with the guide elements for electrically detecting the guide elements and for generating an electrical output indicating their proximity. A computer is connected to the arm and to the sensors for positioning the head relative to the receptacle in accordance with the outputs of the sensors.

Thus with this system once the sensors are close enough to the container to sense the guide elements, the computer can, via appropriate actuators on the arm whose head can be moved by it in three dimensions, move the head in to engage and pick up the container. In the simplest system the operator simply pulls the head of the arm out near the container until the computer can take over. Alternately the actuators of the arm can be controlled by the vehicle operator, for instance via a joystick, to get the arm head in a coarse-positioning mode close enough to the container for the computer to take over in fine-positioning mode and make the link up. Since the electrical guide elements serve for the final connection of the head to the container, it is not necessary to provide the head and container with supplemental mechanical guides as is standard, typically in the form of V-notches and the like. This allows one to use a fairly cheaply made container.

According to the invention a garbage truck carries the pickup arm and computer. Furthermore the container is made of plastic and has a front face carrying the guide elements. The sensors can be imbedded in the container so that the system is largely unaffected by surface dirt, scratches, or the like.

The guide elements and sensors are arranged in identical array according to the invention. The elements can be metallic foils or plates and normally are magnetized or even permanent magnets. The sensors can be inductor coils or hall-effect sensors. The guide elements can be spaced apart in an array forming a code readable by the sensors. Since the elements are in a particular array, random metallic items held in the trash will be easily screened out by the computer since they will not have the desired orientation.

It is further possible according to the invention to provide the container with an identification tag fixed on the container offset from the elements. In this case a tag sensor is connected to the computer for reading the identification tag and generating an output corresponding to data on the tag and feeding it to the computer. The identification tag can carry a bar code, can be divided into zones forming a code, or can be a microchip or magnetic strip capable of interacting with the tag sensor. The computer means includes a memory for storing the outputs.

In the system of this invention the container has a lip and the head has a comb that fits complementarily with the lip. These can be of conventional DIN/AFNOR design and can be provided very cheaply on an otherwise normal garbage pail.

According to a further feature of the invention an ultrasonic distance finder connected to the computer determines the distance between the arm and the container. Two such transmitters can even be provided for triangulation of the target. In addition actuators are provided on the arm for positioning its head. The computer connected to the actuators displaces the head via the actuator means near the container until the sensors can detect the proximity of the guide elements and thereafter positions the head via the actuator means against the container in accordance with the outputs from the sensors. Such an arrangement can be combined with a video camera for determining the position of the container relative to the arm, making it possible for an operator inside the cab to pick up, empty, and return to place garbage pails along a route. The computer can know what shape to look for and can itself read the output of the video camera.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
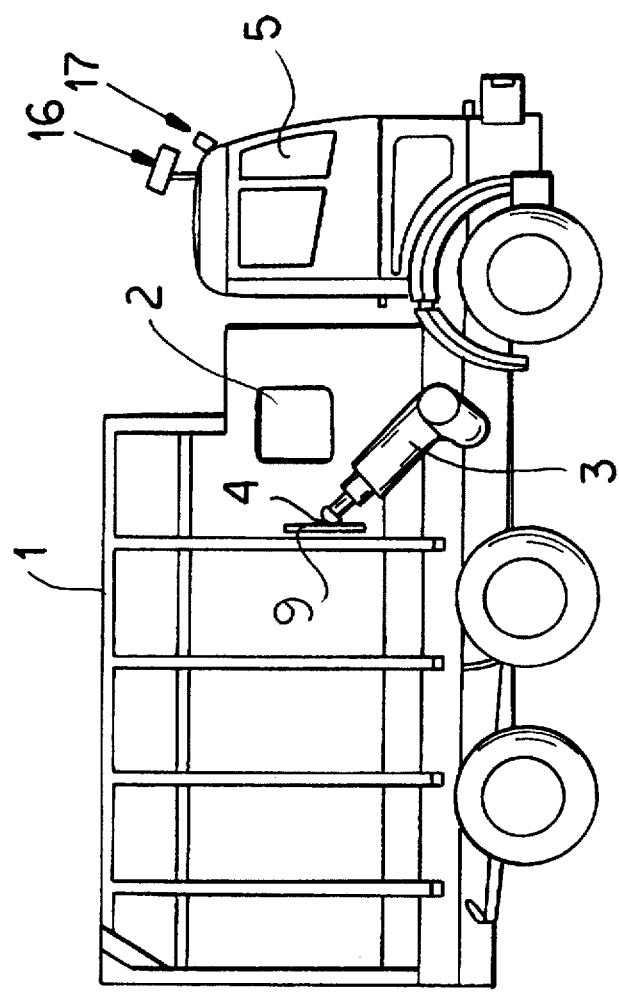
FIG. 1 is a small-scale side view of a garbage truck equipped with the system of this invention.

As seen in FIG. 1 a garbage truck 1 according to the invention has a fill opening 2 into which trash is loaded by a pickup arm 3 having a head 4. The truck 1 also has a driver compartment 5.

Figure 3:
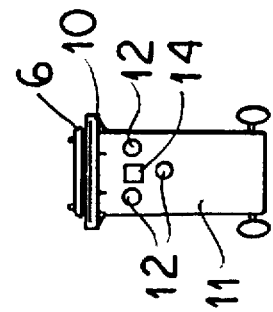
FIG. 3 is a side view of the pickup-arm head.
Figure 4:
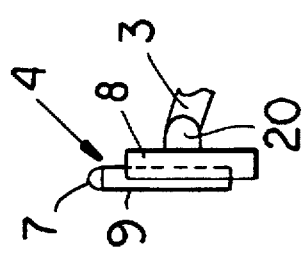
FIG. 4 is a small-scale view of a trash receptacle for use with the inventive system.
Figure 2:
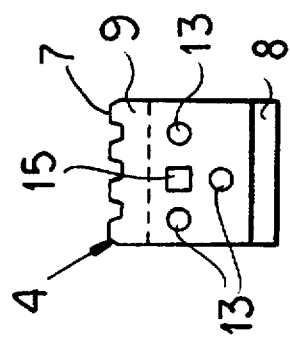
FIG. 2 is a front view of the head of the pickup arm of the apparatus.
Figure 5:
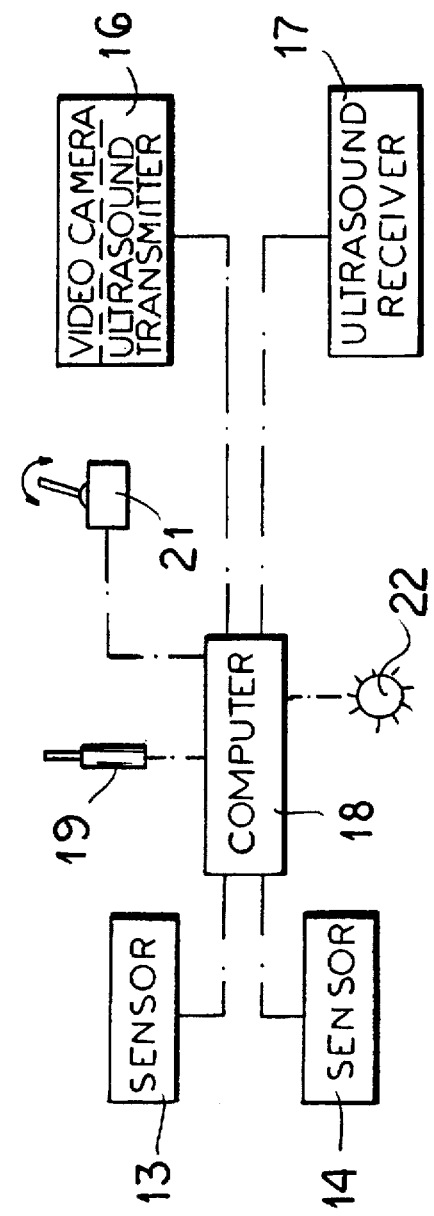
FIG. 5 is a schematic view of the system of this invention.

The pickup-arm head 4 as shown in FIGS. 2 and 3 comprises a guide plate 8 mounted via a ball-joint swivel 20 on the arm 3 and carrying a vertically displaceable pickup plate 9 having an upper end formed as a comb 7. A trash container 6 shown in FIG. 4 has a lip or edge formation 10 shaped to fit complementarily with the comb 7 as described in DIN AFNOR. The arm 3 can move in and out, up and down, and from side to side through a fairly large radius. It has actuators (one shown schematically as 19 in FIG. 5) controlled by a joy-stick input device 21 or the like from inside the cabin 5.

According to the invention the container 6 has a face 11 provided with three metallic guide elements 12 arranged here in an equilateral triangle. The elements 12 are magnetized and are preferably imbedded in the plastic wall of the container 6, although they could be adhered to its surface. In addition the container 6 carries at the center of the array of elements 12 an identification tag 14 that can be formed by a bar code, a block having a plurality of slots representing the number of digits of a code word with the slots filled in to form the code word, a magnetically readable and writable strip, or even an interactive circuit.

The head 4 of the arm 3 carries three similarly arrayed readers 13, normally inductive-sensing coils or hall-effect sensors, and a central sensing/writing unit 15 that can interact with the tag 14. In addition the top of the cabin 5 is provided with an ultrasound transmitter/video camera 16 and ultrasound receiver 17 that can be aimed at the container 6 to roughly establish its position relative to the vehicle 1. A computer 18 (FIG. 5) inside the cabin 5 is connected to the sensors 13 and 14, the sensing/writing unit 15, the actuators 19, the joy stick 21, the ultrasound transmitter 16, and the ultrasound receiver 17.

In use the vehicle 1 is moved near the container 6 to be picked up and the operator uses the joystick 21 to direct the ultrasound transmitter/camera unit 16 at it. The ultrasound detector 17 determines by simple radar principles the approximate distance to the object, while the position of the transmitter 16 is read by the computer 18 to determine where the container 6 is relative to the truck 1. The arm 3 is then actuated to move the head 4 out toward the container 6 until it is close enough for the sensors 13 to detect the elements 12, under joystick control or automatically since the video camera gives position relative to the truck and the detector 17 the distance from it. At this point the automatic fine-positioning mode using the sensors 13 takes over and the head 4 orients itself parallel to and against the face 11 and the plate 9 is slid up to engage under the lip 10. An optical or acoustic signal 22 is activated in the cabin 5 to indicate to the operator that the container 6 is ready to be moved.

If the path is clear, the operator then actuates a button which causes the arm 3 to pick up the container 6, bring it to the opening 2, dump its contents into the opening 2, and then return the container 6 to the exact position it was found in. This is easily done by the computer 3 which records the exact position it was in after linking up but before picking up the container 6. The arm 3 is retracted and the truck 1 moves on to the next pick-up location. The information on the tag 14 can be stored in the computer 18 for billing purposes or the like.

I claim:

1. An apparatus for picking up a trash receptacle, the apparatus comprising:

three metallic and spaced apart and arranged in an equilateral triangle guide elements on the receptacle;

a pickup arm having a head;

means including three respective inductive sensors on the head arranged a respective equilateral triangle identical to the triangle of the guide elements, said sensors being alignable with the guide elements for electrically detecting the guide elements and for generating an electrical output indicating their proximity;

computer means connected to the arm and to the sensors for positioning the head relative to the receptacle in accordance with the outputs of the sensors; and actuator means on the arm for positioning its head, the computer means being connected to the actuator means for displacing the head via the actuator means near the receptacle until the sensors can detect the proximity of the guide elements and for thereafter positioning the head via the actuator means against the receptacle in a pick-up corresponding to direct vertical juxtaposition of the sensors with the metallic guide elements.

2. The apparatus defined in claim 1, further comprising a garbage truck carrying the pickup arm and computer means.

3. The apparatus defined in claim 1 wherein the receptacle is made of plastic and has a front face carrying the guide elements.

4. The apparatus defined in claim 1 wherein the elements are metallic foils or plates.

5. The apparatus defined in claim 1 wherein the elements are magnetized.

6. The apparatus defined in claim 1 wherein the receptacle is made of plastic and the elements are imbedded in the receptacle.

7. The apparatus defined in claim 1 wherein the sensors are inductor coils.

8. The apparatus defined in claim 1 wherein the sensors are hall-effect sensors.

9. The apparatus defined in claim 1 wherein the guide elements are spaced apart in an array forming a code readable by the sensors.

10. The apparatus defined in claim 1, further comprising an identification tag fixed on the receptacle offset from the elements.

11. The apparatus defined in claim 10, further comprising a tag sensor connected to the computer means for reading the identification tag and generating an output corresponding to data on the tag and feeding it to the computer means.

12. The apparatus defined in claim 10 wherein the identification tag carries a bar code.

13. The apparatus defined in claim 10 wherein the identification tag is divided into zones forming a code.

14. The apparatus defined in claim 10 wherein the identification tag is capable of interacting with the tag sensor.

15. The apparatus defined in claim 11 wherein the computer means includes a memory for storing the outputs.

16. The apparatus defined in claim 1 wherein the receptacle has a lip and the head has a comb that fits complementarily with the lip.

17. The apparatus defined in claim 1, further comprising means including an ultrasonic distance finder connected to the computer means for determining the distance between the arm and the receptacle.

18. The apparatus defined in claim 1, further comprising means including a video camera for determining a position of the receptacle relative to the arm.

* * * * *